VARIABLE DELAY LINE USING ELECTROMAGNETIC ENERGY COUPLING

Filed Dec. 20, 1960 3 Sheets-Sheet 1

MILLARD F. GORDON
INVENTOR.

BY NILSSON & ROBBINS
BILLY A. ROBBINS
ATTORNEYS

MILLARD F. GORDON
INVENTOR.
BY NILSSON & ROBBINS
BILLY A. ROBBINS
ATTORNEYS

MILLARD F. GORDON
INVENTOR.
BY NILSSON & ROBBINS
BILLY A. ROBBINS
ATTORNEYS

United States Patent Office 3,212,030

Patented Oct. 12, 1965

3,212,030

VARIABLE DELAY LINE USING ELECTROMAGNETIC ENERGY COUPLING

Millard F. Gordon, Northridge, Calif., assignor to TRW Inc., a corporation of Ohio Filed Dec. 20, 1960, Ser. No. 77,136
9 Claims. (Cl. 333—31)

This invention relates to electromagnetic energy wave transmission apparatus and more particularly to an apparatus for introducing a variable delay to a signal, to a transition apparatus which may be used in conjunction with the variable delay apparatus and which provides a very large frequency band of operation therefor, and to a coupling device which may be used in conjunction with such apparatus.

In many applications it has long been desirable to provide a variable delay to information contained within a particular signal. The delayed signal can then be used after the appropriate variable time delay with various other appropriate apparatus in accordance with well known techniques in the prior art. Although many types of delay lines have been devoleped in the prior art, there is no known variable delay apparatus in which a signal may be generated and then removed at any desired point as it is propagated along the apparatus and in which the point at which the signal is removed may be varied evenly from zero to a pretermined maximum in accordance with design parameters present in a particular application.

There has been a long felt need, particularly in the microwave art, for apparatus which operates efficiently over a wide frequency band. Some microwave devices are capable of being designed to operate over wide frequency bands but, for the most part, the transition device or adapter used to apply or remove the signal to or from the device limits the operational frequency band thereof. Therefore, it has been necessary in the prior art to provide separate devices each of which is specifically designed to operate within a relatively narrow frequency band and to provide a multiplicity of such devices to cover a wide frequency band.

It is also often desirable to provide variable coupling between various units of electromagnetic energy wave transmission apparatus. Such variable coupling permits variation in the amplitude or strength of the signal which is coupled from one device or circuit to another. Such variable couplers in the prior art are, for the most part, complex and difficult to adjust.

Accordingly, it is an object of the present invention to provide an apparatus for imparting variable time delay to a signal which is propagated along it.

It is another object of the present invention to provide an apparatus which is capable of imparting a variable delay to a particular signal and from which the signal may be removed at any point in accordance with the particular delay desired for any given application.

It is another object of the present invention to provide an apparatus in which the relationship between insertion loss and time delay can be infinitely varied.

It is another object of the present invention to provide a transition device, for use in combination with electromagnetic energy transmission apparatus, which provides the capability of operating over an exceedingly broad band of frequencies.

It is another object of the present invention to provide an exceedingly simple and rugged microwave apparatus which provides variable coupling for a signal and which is easily and accurately adjustable.

It is a further object of the present invention to provide apparatus for receiving and variably delaying an electromagnetic energy signal which has a broad band of frequencies and for applying such a signal to a desired circuit after varying the strength thereof.

In accordance with one aspect of the present invention, there is provided an elongated solid dielectric material having at least one open surface and to which there is electrically connected a means for generating or launching an electromagnetic energy wave therein. Means for coupling the electromagnetic energy wave from the elongated member is positioned adjacent thereto. Means for imparting relative movement between the member and the coupling means is provided to permit coupling of the signal from the member at any point therealong, thereby providing a variable delay to the signal which is launched within the elongated member.

More particularly, a variable delay having means electrically connected thereto for launching an electromagnetic engery wave therein, in accordance with the present invention, includes a helically shaped, elongated, solid dielectric member having electrically conductive coatings on opposed, substantially parallel faces thereof and at least one uncoated surface. The helically shaped member is mounted within an appropriate frame and a coupling device is mounted adjacent thereto. Relative rotary motion between the helically shaped member and the coupling device is initiated and controlled so that the coupling device tracks a surface of the helically shaped member. As the helically shaped member, having an electromagnetic energy wave signal propagated therealong, moves relative to the coupling device, the coupling device couples the signal applied to the helically shaped member therefrom and into a desired circuit after any predetermined desirable delay. The amount of delay to which the signal is subjected is determined in accordance with any desired application by the position of the coupling device with respect to the helically shaped member.

In accordance with another aspect of the present invention, the means provided for launching the electromagnetic energy wave signal within the helically shaped member above described permits the variable delay line to operate efficiently over a broad frequency band. In accordance with the energy wave signal launching means there is provided a broad band transition device which is electrically connected to an open end of the solid dielectric material for generating the electromagnetic energy wave signal within the solid dielectric material. More specifically, an electrically conductive member is positioned between electrical extensions of the electrically conductive coatings on the solid dielectric material. The member is positioned in such a manner as to electrically contact one of the extensions and be insulated from the other so as to permit it to extend substantially across the dielectric material and adjacent thereto. In this manner the electromagnetic energy wave signal which is present within the member is launched within the dielectric material and is propagated along the helically shaped member between the electrically conductive coatings.

In accordance with still another aspect of the present invention, the coupling device above referred to may be relatively movable with respect to a surface of the elongated helically shaped member to thereby provide variable coupling of the output signal to any desired circuit. More specifically, the distance between the surface of the helically shaped member and the surface of the coupling device may be varied in accordance with the delay imparted to the signal in such a manner as to provide a constant output signal irrespective of signal delay.

Other and more specific objects and advantages of the apparatus in accordance with the present invention may be determined from a reading of the following description taken in conjunction with the accompanying drawings which are presented by way of example only and are not intended as a limitation upon the scope of the present invention, the novel features of which are set forth in the appended claims, and in which:

Figure 1:
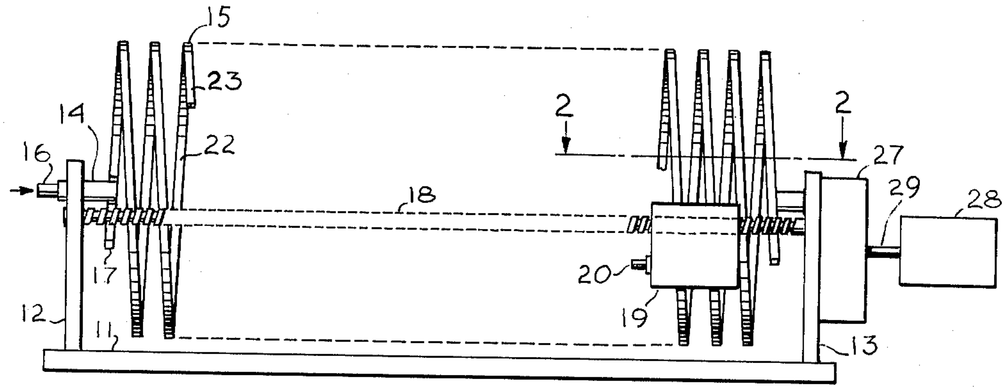
FIGURE 1 is a side elevational view of a variable delay line in accordance with the present invention.

Referring now to the drawings and more particularly to FIG. 1 thereof, a variable delay line, in accordance with the present invention, is illustrated. The variable delay line includes a base 11 having a pair of upstanding members 12 and 13. Journalled between the upstanding members 12 and 13 is a spindle 14 upon which is rotatably mounted an elongated solid dielectric member 15 which is preferably in the form of a helix as illustrated.

Although the dielectric member 15 as illustrated in FIG. 1 is in the form of a helix, it is to be expressly understood that a variable delay line in accordance with the present invention may have any geometric configuration desired. For example, the dielectric member may take the form of a straight, spiralled or sinuous shaped member. The only requirement which must be met is that the signal propagated along the dielectric member must be delayed a predetermined amount over the length thereof and must be subject to being coupled therefrom at substantially any point along the line.

Preferably the delay line is of the solid high dielectric constant type material having a thin coating of electrically conductive material on opposed substantially parallel surfaces thereof. When placed in the helical configuration above described, the electrically conductive coatings are disposed upon the surfaces transverse to the longitudinal axis of the helix, thereby providing an uncoated, substantially electrically nonconductive, surface along both the inner and outer surfaces of the helix, as shown at 22 and 23, respectively, In this manner the signal propagated along the delay line may be removed at any point along either nonconductive surface of the helix, as more fully described below.

As is well known in the prior art, an electromagnetic energy wave signal which is launched within a wave guide, including high dielectric constant material having metallic coatings on certain of the opposed surfaces thereof, with other surfaces being uncoated, is not wholly contained within the wave guide. A strong electric field is established at the uncoated surfaces of the wave guide as a result of the reflective character of the high dielectric constant material and the atmosphere within which the wave guide operates. However, a magnetic field is set up about the wave guide and it extends from the uncoated surfaces thereof. It is this phenomenon which provides the coupling in accordance with the variable delay line and variable coupling element of the present invention as described below. By placing a surface of a section of wave guide similar in construction to that above described adjacent the wave guide or delay line having a signal propagated along it, a signal is generated within the section by the magnetic field extending from the uncoated surfaces of the wave guide.

A transition device or adapter is provided for launching an electromagnetic energy wave in the dielectric member 15 between the conductors on the opposed surfaces thereof. Any transition device may be used so long as the signal desired may be launched within the delay line. However, the broad band transition device described below is preferably utilized to provide a delay line which will operate over a wide frequency band. A flexible coaxial line (not shown) is connected to a broad band transition device (not shown) and to a coaxial rotary joint (not shown) which in turn cooperates with the input connector 16 for launching the desired signal in the delay line. The dielectric member 15 is terminated at its opposite end 17 in its characteristic impedance. For example, a delay line constructed of titanium dioxide and having electrically conductive coatings of silver and a width of .150 inch and height of .150 inch and formed in the configuration of a helix having nine turns of about 4.5 inches in diameter and spaced about .5 inch apart is terminated in an impedance of approximately 50 ohms. This termination can be accomplished by connecting an appropriate resistance element across the coatings at one end of the delay line using techniques well known to the art.

Supported adjacent the surface of the dielectric member 15 is a means for coupling a signal therefrom at any point along its surface. For example, a worm gear 18 is journalled between the upstanding members 12 and 13. The worm gear 18 supports and moves a housing 19 within which is supported means for coupling the signal propagated along the dielectric member 15 to any desired circuit. The signal may be coupled from the dielectric member 15 at any point along its surface, thus providing a desired predetermined delay thereto. An output connector 20, similar to the input connector 16, is utilized to apply the signal coupled from the dielectric member 15 to any desired circuit for further utilization.

Figure 2:
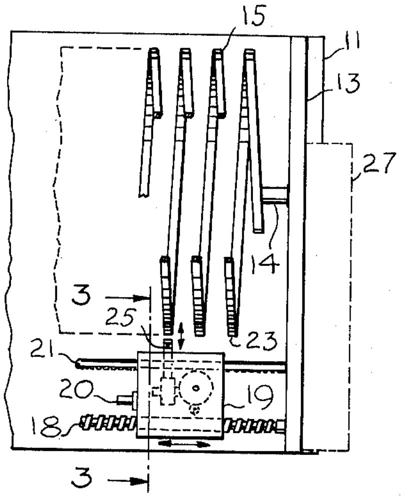
FIG. 2 is a top elevational view, partly in cross section, of the apparatus of FIG. 1 taken about the lines 2—2.

As is shown more clearly in FIG. 2, the means for coupling the signal from the dielectric member 15 includes a coupling arm 25 which is constructed of similar material to that of the dielectric member 15. The coupling arm 25 is disposed adjacent the outer surface 23 of the dielectric member 15 in opposed relationship thereto and is movable longitudinally and transversely relative thereto, as is indicated by the arrows adjacent the coupling arm 25 in FIG. 2. One end of the coupling arm 25 is terminated in the characteristic impedance 26 (FIG. 3) thereof.

There is also provided a guide bar 21 which extends through the housing 19 and is supported between the upstanding members 12 and 13 for guiding the coupling means in its longitudinal motion adjacent the outer surface 23 of the dielectric member 15.

As is well known in the prior art, the strength of a signal which is applied to one end of a wave guide or delay line, such as is illustrated in FIGS. 1 and 2 and above described, diminishes as it travels along the wave guide so that at the opposite end thereof the strength of the signal is somewhat less than it is at the point of application. It is at times desirable to have the signal which is coupled from the delay line to a desired circuit of equal strength irrespective of the delay. One example of an application wherein such a constant output signal is desirable is the use of the delayed signal in a closed servo loop. If the signal strength were permitted to vary with delay, the gain of the servo loop would also vary with delay, and such gain variation is undesirable.

Since the strength of the signal diminishes as the delay increases, means shall be provided in such cases to increase the losses between the coupling device and the delay line as the delay is decreased, or to decrease the losses as the delay is increased. In this manner, if the amount of loss between the coupling device and the delay line is synchronized with the amount of delay, the strength of the signal coupled from the delay line remains substantially constant over the entire period of delay.

Figure 3:
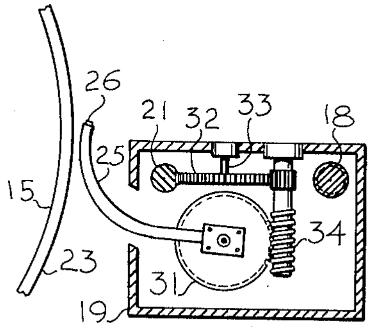
FIG. 3 is a partial side elevational view, partly in cross section, of the apparatus of FIG. 2 taken about the lines 3—3 thereof.

One means of accomplishing the constant signal strength as compared to delay time is shown in FIG. 3. As is therein illustrated, the coupling arm 25 is affixed to a gear 31. As the gear 31 is caused to rotate, the coupling arm 25 is advanced closer to or removed further from the outer surface 23 of the dielectric member 15. Rotation of the gear 31 is obtained through rotation of gear 32 which is rotatingly supported by the shaft 33 upon the surface of the housing 19. Teeth are provided in one edge portion of the guide bar 21 which is rigidly held in place between the upstanding members 12 and 13, as illustrated in FIG. 2. Rotation of gear 32 drives a worm gear 34 which meshes with gear 31 and in turn causes it to rotate.

A variable delay line in accordance with the present invention is operated by applying a signal through the input connector 16 to one end of the dielectric member 15. The dielectric member 15 is rotated about spindle 14 by means well known to the art, such as, for example, a gear train 27 (FIG. 1) which is driven, for example, by any desired power source 28 through a shaft 29 or by way of a manually operated dial affixed thereto. As the dielectric member 15 is rotated, the gear train 27 also rotates the worm gear 18. As the worm gear 18 rotates, the housing 19 within which the coupling arm 25 is mounted moves along the worm gear. The guide bar 21 prevents the housing 19 from rotating and, in addition, aids in guiding it in its motion with respect to the dielectric member 15.

As the housing 19 moves along the guide bar 21, the teeth on the edge portion of gear 32 mesh with the teeth along the guide bar 21, thus causing the gear 32 to rotate at a speed proportional to the speed of movement of the housing 19. As the gear 32 rotates, it in turn rotates the worm gear 34, the teeth of which mesh with the teeth of gear 31. As gear 31 rotates, it moves the coupling arm 25 closer to or further from the outer surface 23 of the dielectric member 15, as illustrated in FIG. 3. For example, if the coupling arm 25 is adjacent the edge portion of the dielectric member 15 which is nearest the input connector 16, as viewed in FIG. 1, the coupling arm 25 is widely spaced therefrom, since the signal strength at this point is the strongest. If, at this point, the dielectric member 15 and the worm gear 18 begin to rotate in accordance with a command signal applied to the power source 28, the housing 19 is moved away from the input connector 16, or toward the right, as viewed in FIG. 1. As the housing 19 moves toward the right, the gear 32 and worm gear 34 rotate in such a manner as to cause gear 31 to rotate in a counterclockwise manner (as viewed in FIG. 3), thus causing the coupling arm 25 to move closer to the outer surface 23 of the dielectric member 15. Thus, as the delay of the signal which is applied to the dielectric member 15 increases, the coupling arm 25 moves closer to the outer surface 23 of the dielectric member 15, thereby causing less insertion loss between the two. In this manner the strength of the signal which is applied to any particular circuit through the output connector 20 is maintained relatively constant irrespective of the delay of the signal.

Other means than that above described may be utilized to accomplish the constant signal strength irrespective of delay. For example, the guide bar 21 and worm gear 18 may be mounted at an angle to the longitudinal axis of the dielectric member 15. The angle is chosen so that the space between the guide bar 21 and the outer surface 23 of the dielectric member 15 is greater at the end of the dielectric member to which the signal is applied than at the opposite end thereof. With such a configuration, the coupling arm 25 is maintained stationary with respect to the housing 19. In this manner the strength of the signal which is coupled from the dielectric member to any given circuit is again maintained constant irrespective of the time delay imparted to the signal by the dielectric member 15.

Although only one coupling arm is illustrated for providing a delayed output signal from the delay line in the presently preferred embodiment of the present invention, it is to be expressly unuderstood that any number of coupling arms such as that illustrated at 25 may be spaced about the periphery of the dielectric member 15. This, for example, can be easily accomplished by merely extending the upstanding members 12 and 13 in such a manner as to space apparatus similar to the worm gear, guide member, and housing shown in FIGS. 1 and 2 at various points about the periphery of the dielectric member 15. In this manner the signal applied to the dielectric member 15 may be coupled to any number of circuits desired and at any particular delay which may be required for the design considerations of the particular application.

Although the consideration of maintaining a constant signal strength for the output signal from the delay line has been described in detail above, it is obvious that where, in some applications, the signal strength may be needed as an indication of delay or for other purposes, the apparatus for providing a constant signal strength may be deleted or it may be arranged in a manner which is the reverse of the above so that a stronger signal is utilized when the delay is less and a weaker signal is utilized as the length of the delay is increased. It should, therefore, become obvious that the relationship of the signal strength which is present in the output signal from the delay line and the delay which is obtainable therefrom is infinitely variable in accordance with the particular design applications for any given circuit.

Although there has been described above, in accordance with one embodiment of the present invention, an apparatus whereby the desired variable delay of a signal is obtained by rotating a helically shaped dielectric member and moving a coupling arm along the outer surface thereof, it should be expressly understood that this result may be obtained in other manners. For example, the delay line may be held stationary and the coupling arm or arms rotated about either the inner or outer surface thereof; the coupling arm may be held stationary and the delay line rotated and moved longitudinally; or the coupling arm may be supported internally of the delay line adjacent the inner surface of the dielectric member and relative movement thereof with respect to the dielectric member obtained. Other mechanical apparatus will become apparent to those skilled in the art for accomplishing the desired relative movement between the delay line, irrespective of its configuration, and the coupling arm.

A variable delay line in accordance with the present invention may be used in many applications. One example is where it becomes desirous to conduct phase measurements. During such measurements it becomes necessary to provide extremely fine delay variations to a particulate signal. With the delay line above described, it is apparent that infinitestimal delay variations may be smoothly obtained.

Figure 4:
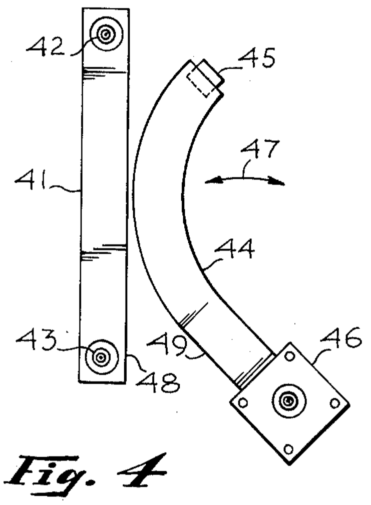
FIG. 4 is a side elevational view of a variable coupling device in accordance with the present invention.

Referring now more particularly to FIG. 4, there is further illustrated a variable coupling device in accordance with the present invention. As is therein illustrated, there is provided a wave guide 41 having an input transition device 42 at one end thereof for the application of a signal thereto and an output transition device 43 at the other end thereof. A variable coupling arm 44, which is pivoted and which is terminated at one end thereof in its characteristic impedance 45 and to which there is preferably affixed a broad band transition device 46 in accordance with the present invention and as more fully described below, is provided. The terminating characteristic impedance of the variable coupling arm is typically chosen for the mean frequency of the frequency band within which the variable coupling device is to operate. As is illustrated by the arrow 47, the variable coupling arm 44 is movable toward and away from the wave guide 41. Such movement may be accomplished by any means known to the art such as, for example, a knob or dial. Preferably both the wave guide 41 and the variable coupling arm 44 are solid dielectric material having electrically conductive coatings spaced on opposed surfaces thereof, as above described. The wave guide and coupling arm are arranged in such a manner that the two adjacent surfaces 48 and 49 are uncoated and are in opposed relationship.

In operation, a signal is applied to the wave guide 41, for example, by connecting a coaxial cable or the like to the input transition device 42. The signal is removed from the wave guide 41 by attaching another coaxial cable or the like to the output transition device 43. A coaxial cable or the like is connected to the broad band transition device 46 connected to one end of the variable coupling arm 44 so that a signal may be applied therefrom to any particular circuit which is desired. In order to obtain the signal strength which is needed for the particular circuit, the variable coupling arm 44 is pivoted about its pivot point to any desired position. As the variable coupling arm 44 is moved away from the wave guide 41, the strength of the signal generated therein is decreased. Conversely, as the variable coupling arm 44 is moved closer to the wave guide 41, the signal strength is increased. The signal strength present in the variable coupling arm 44 is at its maximum when it is in physical contact with the wave guide 41.

Figure 5:
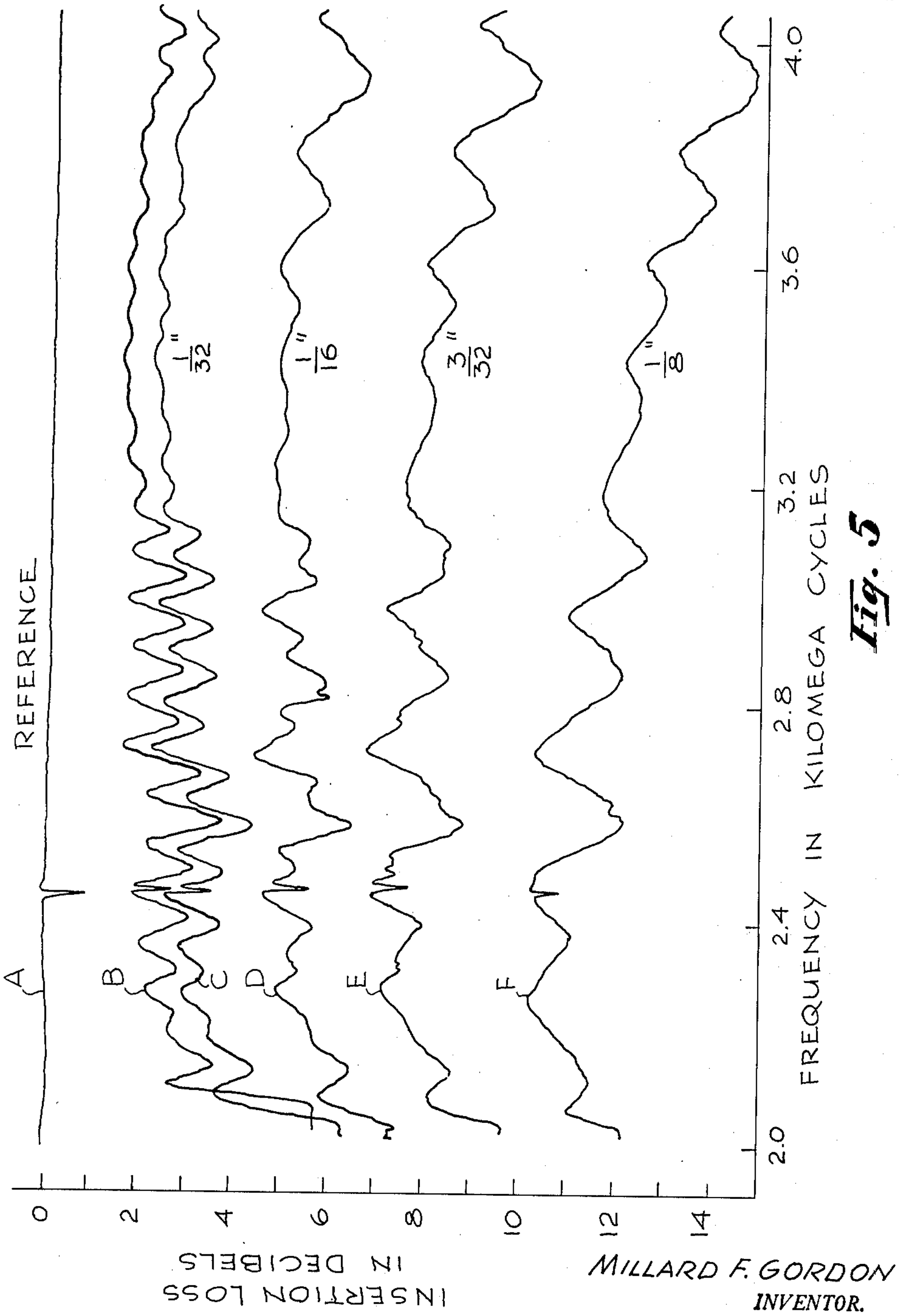
FIG. 5 is a graph illustrating insertion loss versus spacing of the variable coupler illustrated in FIG. 4.

An example of the signal strength present in a coupling arm as compared to the spacing between the coupling arm and the delay line of FIGS. 1 and 2 or the wave guide of FIG. 4 may be seen by reference to the graph of FIG. 5, in which insertion loss in decibels is plotted along the vertical axis and frequency is plotted along the horizontal axis. Curve A is the zero decibel reference point. Curves B through F were taken by respectively moving the variable coupling arm 44 from a position of being in physical contact with wave guide 41 through $\frac{1}{32}$ inch intervals to a maximum of $\frac{1}{8}$ inch. As can be seen from the graph of FIG. 5, the insertion loss is less when the coupling arm and wave guide are in physical contact and increases as the coupling arm is moved farther away from the wave guide. In other words, the signal strength present in the coupling arm is strongest when the coupling arm and wave guide are in contact and diminishes as the spacing increases.

Figure 6:
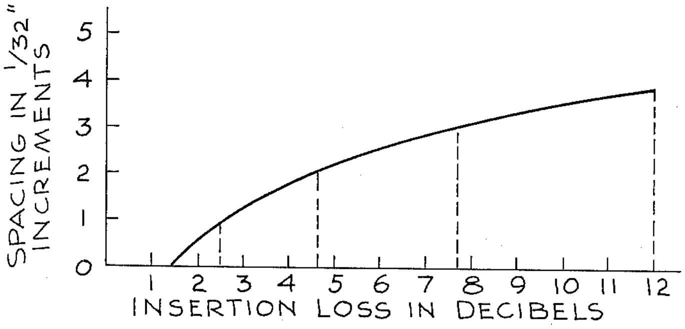
FIG. 6 is a graph illustrating a particular relationship of the curves shown in FIG. 5.

As can be seen by comparing the insertion loss against spacing for any given frequency, the insertion loss increases approximately linearly with spacing. This is more clearly seen by referring to FIG. 6, which is a curve plotted with spacing along the vertical axis and insertion loss along the horizontal axis taken at a frequency of 3,600 megacycles. Therefore, it can be seen that a direct relationship between signal strength and spacing is available and can be utilized to calibrate a variable coupling device of the type described or to obtain a constant signal strength irrespective of delay in accordance with the variable delay line above described.

Although a variable coupling device in accordance with the present invention is illustrated as being used with the variable delay line of the present invention, there are many other applications wherein a variable coupling device of the type above described may be utilized. For example, where a receiver of electromagnetic wave energy is positioned relatively close to the source thereof, it is desirable to reduce the signal strength coupled into the receiver. By using a variable coupling device of the type above described, the signal applied to the receiver may be varied over a wide range.

Figures 7, 8, 9:
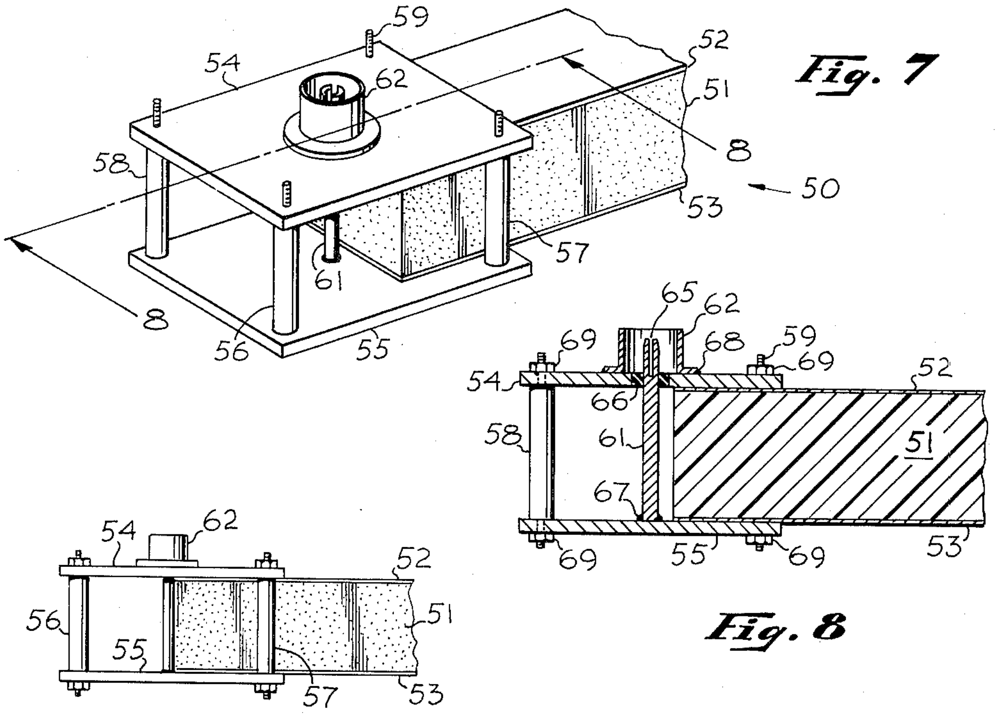
FIG. 7 is a perspective view of the broad band transition device in accordance with the present invention.
FIG. 8 is a cross-sectional view of the broad band transition device of FIG. 7 taken about the lines 8—8.
FIG. 9 is an elevational view of an alternative embodiment of a broad band transition device in accordance with the present invention.

Referring now more particularly to FIG. 7, there is illustrated a broad band transition device in accordance with the present invention. As is therein illustrated, a length of wave guide 50, being constructed of solid dielectric material 51 having coatings of electrically conductive material 52 and 53 applied to opposite, substantially parallel surfaces thereof, is provided. A pair of electrically conductive plates 54 and 55 are disposed on opposite surfaces of the wave guide and in electrical contact with the electrically conductive coatings 52 and 53, respectively. Insulating bolts 56 through 59, which, for example, may be constructed of such material as Teflon, are used to hold the electrically conductive plates in electrical contact with the coatings and to space the plates 54 and 55 the required distance apart. An electrically conductive member, such as a metallic pin 61, extends through plate 54 and is insulated from it. The pin 61 extends across the space between plates 54 and 55 and makes electrical contact with plate 55. The pin 61 may be an extension of a coaxial cable (not shown) which is affixed to a connector 62 that is secured to the plate 54 and is in electrical contact therewith. The electromagnetic energy which is present within an attached coaxial cable is by way of pin 61 launched within the dielectric material 51 and is propagated therealong between the electrically conductive coatings 52 and 53.

As is illustrated more clearly in FIG. 8, the pin 61 may include a recess 65 that is adapted to receive the center conductor of a coaxial cable. The pin 61 is insulated from plate 54 by the insulator 66 and makes electrical contact with plate 55 by solder 67 or the like. The connector 62 may be secured to plate 54 by means of solder 68 or the like. Insulating bolts 56 through 59 may be held in place between the plates 54 and 55 by nuts 69, and the bolts may have enlarged center sections for spacing the plates 54 and 55 apart.

As will be noted from the drawings, the wave guide is open-ended at the end adjacent the pin 61. In this manner, the wave guide is not limited to energy having a narrow frequency band.

In the prior art, transition devices have been inserted into wave guides a particular distance from a shorted end thereof. The distance has usually been one-quarter wave length of the mean frequency of the operating frequency band of the wave guide or some odd multiple thereof. Such a structure has been limited to operation within a predetermined frequency band. It has been discovered that by utilizing an open-ended wave guide and by placing an electrically conductive member adjacent the open end, the wave guide is usuable over a very broad frequency band. For example, such a structure may be used over a frequency band of about 100 kiloycycles to about 4 kilomegacycles.

As will be noted in FIGS. 7 and 8, the wave guide 51 is open-ended and the pin 61 is positioned adjacent the open end thereof. A space may be provided between the pin 61 and the open end of the wave guide 51. The spacing is not critical so long as the insertion loss between the pin and the open end of the wave guide is not so great as to diminish the signal to such a degree that it becomes unusable. The minimum possible spacing is direct physical contact, as is illustrated in FIG. 9. The only precaution which should be taken with direct contact between pin 61 and wave guide 50 is that the pin 61 should not be permitted to make electrical contact with the coating 52. If this were permitted to occur, the signal would be shorted between the plates 54 and 55.

Figure 10:
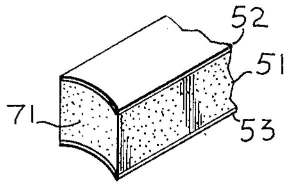
FIGS. 10 and 10(*a*) are alternative arrangements of a wave guide for use in conjunction with a broad band transition device in accordance with the present invention.
Figure 10A:
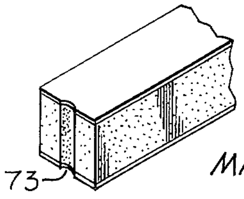

It does not appear that the particular configuration of the open end of the wave guide 50 is critical. As is illustrated in FIGS. 7 through 9, the open end of the wave guide may be flat. Alternatively, as illustrated in FIG. 10, the open end of the wave guide may be provided with a concave face 71. The pin 61 may be placed in direct physical contact with face 71 or may be spaced therefrom as above described.

A further modification of the open end of the wave guide is illustrated in FIG. 10(*a*), which shows a flat face having a recess 73 provided therein. The recess may have a diameter such that a portion of pin 61 may be received therein.

Irrespective of the particular configuration of the open end of the wave guide or the spacing of the pin with respect thereto, a transition device of the type above described provides operation over a wide frequency band and may be used to easily extend the upper frequency range of presently known and used wave guide structures.

There has been thus disclosed a variable delay line which includes a variable coupler and which may be used over a broad frequency band when employing the broad band transition device above described.

What is claimed is:

1. A transmission device for receiving and variably delaying an electromagnetic energy wave signal, said device including the combination of: an elongated member of high dielectric constant material having at least one substantially electrically nonconductive surface and at least one electrical conductor along which signals may be propagated; means affixed to one end of said elongated member for launching an electromagnetic energy wave signal therein; coupling means disposed adjacent said substantially electrically nonconductive surface of said elongated member; and means for imparting relative movement between said elongated member and said coupling means to permit said coupling means to be variably positioned along substantially the entire length of said elongated member, whereby said signal is coupled from said elongated member to said coupling means a predetermined variable time after being launched in said elongated member, said variable time being determined by the position of said coupling means along said elongated member.

2. A transmission device for receiving and variably delaying an electromagnetic energy wave signal, said device including the combination of: an elongated member of high dielectric constant material having at least one substantially electrically nonconductive surface and at least one electrical conductor along which signals may be propagated; means affixed to one end of said elongated member for launching an electromagnetic energy wave signal therein; a coupling member of high dielectric constant material having at least one substantially electrically nonconductive surface disposed adjacent said substantially electrically nonconductive surface of said elongated member and disposed in opposed relationship therewith; and means for imparting relative movement between said elongated member and said coupling member to permit said coupling member to be variably positioned along substantially the entire length of said elongated member, whereby said signal is coupled from said elongated member to said coupling means a predetermined variable time after being launched in said elongated member, said variable time being determined by the position of said coupling member along said elongated member.

3. A transmission device for receiving and variably delaying an electromagnetic energy wave signal, said device including the combination of: an elongated member of high dielectric constant material having electrically conductive coatings on opposed, substantially parallel surfaces thereof and at least one substantially electrically nonconductive surface; means affixed to one end of said elongated member for launching an electromagnetic energy wave signal therein; a coupling member of high dielectric constant material having at least one substantially electrically nonconductive surface disposed adjacent said substantially electrically nonconductive surface of said elongated member and disposed in opposed relationship therewith; and means for imparting relative transverse and longitudinal movement between said elongated member and said coupling member whereby said signal is coupled from said elongated member a predetermined variable time after being launched therein, said variable time being determined by the position of said coupling member with respect to said elongated member.

4. A variable delay line comprising: an elongated member of high dielectric constant material in the form of a helix and having at least one substantially electrically nonconductive surface, said substantially electrically nonconductive surface being disposed upon the outer surface of said helix; means electrically connected to one end of said helix for launching an electromagnetic energy wave signal therein; means for rotating said helix about the longitudinal axis thereof; coupling means of high dielectric constant material having at least one substantially electrically nonconductive surface; means for positioning said substantially electrically nonconductive surface of said coupling means adjacent said substantially electrically nonconductive surface of said helix; and means for causing said substantially electrically nonconductive surface of said coupling means to track said substantially electrically nonconductive surface of said helix during the time said helix is rotated, whereby a signal launched within said helix is coupled therefrom a predetermined time later by said coupling means, said predetermined time being determined by the position of said coupling means with respect to said helix.

5. A variable delay line including the combination of: a frame member; an elongated, substantially helical member of high dielectric constant material having electrically conductive coatings on opposed, substantially parallel surfaces thereof and at least one substantially electrically nonconductive surface rotatably mounted upon said frame member; means for rotating said elongated helical member; means affixed to one end of said elongated helical member for launching an electromagnetic energy wave signal therein; a coupling member of high dielectric constant material having at least one substantially electrically nonconductive surface disposed adjacent said substantially electrically nonconductive surface of said elongated helical member, said substantially electrically nonconductive surfaces being in opposed relationship; and means for moving said coupling member longitudinally of said elongated helical member and for maintaining said opposed relationship between said substantially electrically nonconductive surfaces during the time said elongated helical member is rotated, whereby said signal is coupled from said elongated helical member a predetermined variable time after being launched therein, said variable time being determined by the position of said coupling member with respect to said elongated helical member.

6. A variable delay line including the combination of: an elongated substantially helical member of high dielectric constant material having electrically conductive coatings on opposed, substantially parallel surfaces thereof and at least one substantially electrically nonconductive surface; means affixed to one end of said elongated helical member for launching an electromagnetic energy wave signal therein; means for rotating said elongated helical member about the longitudinal axis thereof; a coupling member of high dielectric constant material having at least one substantially electrically nonconductive surface; means for mounting said coupling member adjacent said elongated helical member with said substantially electrically nonconductive surfaces in opposed relationship; means for moving said coupling member longitudinally of said elongated helical member and for maintaining said substantially electrically nonconductive surfaces in opposed relationship during the time said elongated helical member is being rotated, whereby said signal is coupled from said elongated helical member a predetermined time after being launched therein, said time being determined by the position of said coupling member with respect to said elongated helical member; and means for moving said coupling member transversely of the longitudinal axis of said elongated helical member to thereby vary the strength of the signal coupled from said elongated helical member.

7. A variable coupler comprising: first and second members of high dielectric constant material each having electrically conductive surfaces on opposed, spaced apart surfaces thereof and at least one substantially electrically nonconductive surface, said first and second members being disposed so that said substantially electrically nonconductive surfaces are in opposed relationship; means for launching an electromagnetic energy wave signal within said first member; means for imparting relative transverse movement between said first and second members, whereby the spacing between said substantially electrically nonconductive surfaces is varied and the signal launched within said first member is generated within said second member at a signal strength which varies proportionally to said spacing and means for imparting relative longitudinal movement between said first and second members whereby said signal being generated within said second member is delayed in proportion to said longitudinal movement.

8. A variable coupler as in claim 7, said first member having a signal attenuation characteristic proportional to the length a signal travels therein, said means which varies the spacing between said members being adapted to vary the spacing in accordance with the longitudinal movement of said members whereby signal strength is increased due to closer spacing as the signal is attentuated with increased signal delay, thereby producing a time varied signal of constant amplitude.

9. A variable coupler comprising: first and second members, said first member having a signal path adapted to delay and attenuate signals uniformly along its length, means for moving said second member in proximity with and along said path for coupling signals therefrom at various time intervals, and means for decreasing coupling losses between said members as said second member is moved relative to said first member in a direction to increase the time of delay of the signal coupling to said second member, whereby signals received in said second member are of a signal strength independent of the time of signal delay.

References Cited by the Examiner

UNITED STATES PATENTS

| | | | |
|---|---|---|---|
| 2,648,000 | 8/53 | White | 333—31 |
| 2,755,447 | 7/56 | Engelmann | 333—84 |
| 2,799,830 | 7/57 | Fubini et al. | 333—24 |
| 2,836,814 | 5/58 | Nail | 333—31 |
| 2,877,429 | 3/59 | Sommers et al. | 333—24 |
| 2,961,620 | 11/60 | Sommers | 333—31 |
| 2,995,717 | 8/61 | Schoennauer | 333—31 |
| 3,001,153 | 9/61 | Luke | 333—31 |
| 3,025,480 | 3/62 | Guanella | 333—84 X |
| 3,047,822 | 7/62 | Lakatos | 333—31 |
| 3,139,597 | 6/64 | French et al. | 333—31 |

HERMAN KARL SAALBACH, *Primary Examiner.*

ELI SAX, BENNETT G. MILLER, *Examiners.*